March 5, 1929.  I. COHEN  1,704,590
ICE CREAM MANUFACTURING AND SODA FOUNTAIN APPARATUS
Filed Oct. 6, 1922  2 Sheets-Sheet 2
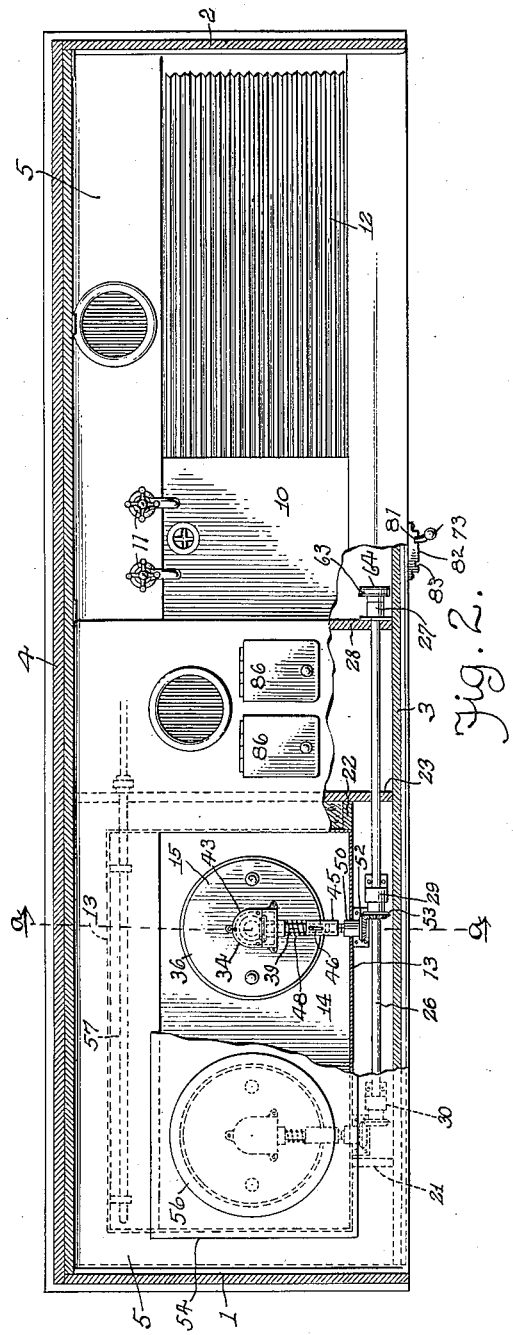
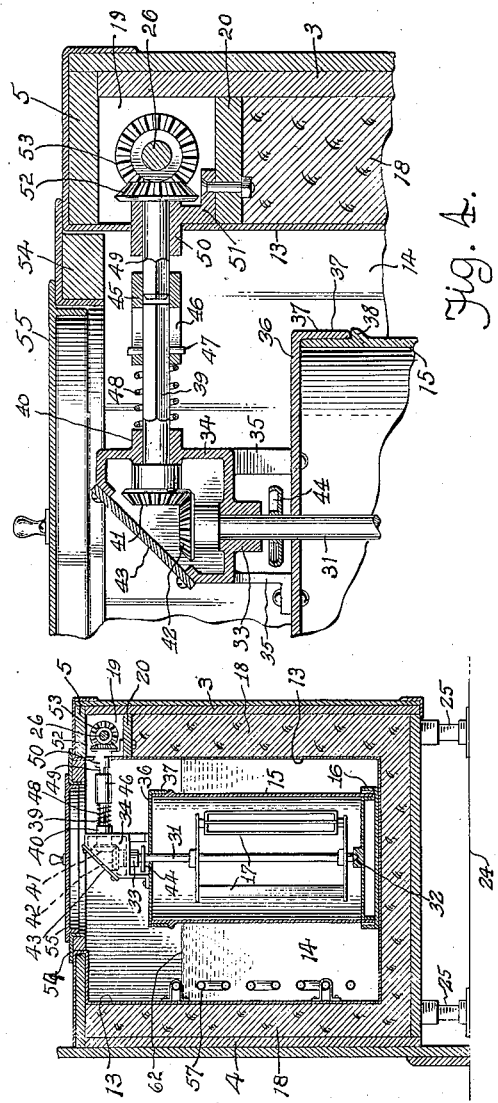
Inventor
Ira Cohen
By
Attorney Patented Mar. 5, 1929.

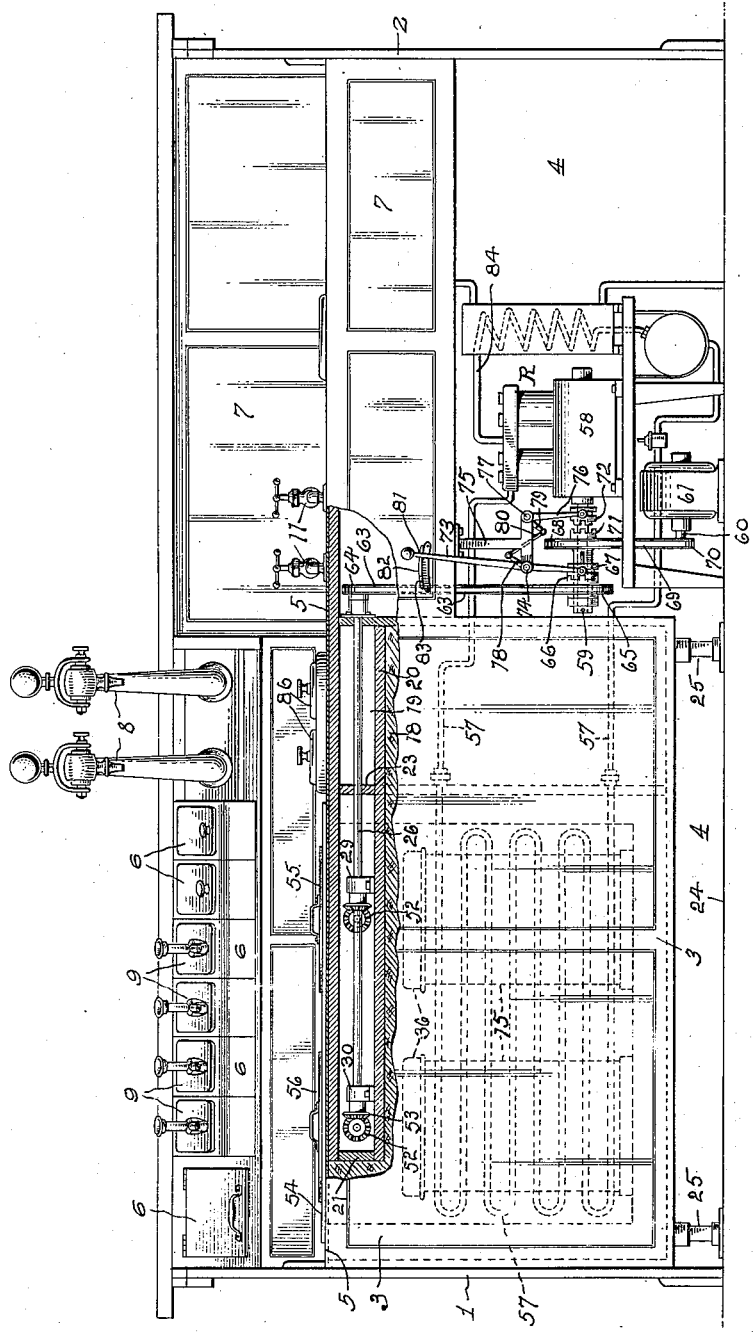

1,704,590

UNITED STATES PATENT OFFICE.

IRA COHEN, OF HIGHLAND PARK, MICHIGAN.

ICE-CREAM-MANUFACTURING AND SODA-FOUNTAIN APPARATUS.

Application filed October 6, 1922. Serial No. 592,693.

This invention relates to store display fixtures or furniture or apparatus more especially designed for the use of confectioners, druggists or other retail dispenser of ice cream and soda delicacies, and has for its object to provide a convenient, efficient and self-contained structure of this class embodying its own refrigerating means or plant for freezing ice cream and for maintaining proper low temperatures in various compartments holding the flavoring syrups or other supplies usually stored in apparatus of this general character.

The invention will be described in the following specification having appended claims clearly defining the novel features, and with reference to the accompanying drawings in which Figure 1 is a rear or inside elevation of one embodiment of this improved refrigerating ice cream and soda fountain apparatus, partly broken away and in section;

Fig. 2 is a sectional plan view thereof with upper rear storage compartments removed;
Fig. 3 is a vertical transverse section taken on the line $a$—$a$ in Fig. 2; and Fig. 4 is an enlarged detail sectional view more especially showing detachable portions of the power transmission mechanism operating ice cream agitators.

The outer casing or frame of this apparatus comprises two opposite end walls 1, 2, a rear wall 3, and a front wall 4. Portions of the walls 1, 2, 4, rise considerably above the horizontal work table 5 to provide a support for various receptacles 6 and closets 7, the liquid soda dispensing heads 8, and the soda flavoring syrup vessels 9. Within an opening at one end of the work table 5, are located a sink 10 and water faucets 11 providing for washing used glasses or dishes which then may be placed on the sloping corrugated drainage board 12 in easy reach of the attendant.
In apparatus of this class it has heretofore been customary to place ice cream containing vessels in a compartment or chamber at the left-hand lower portion of the casing and to pack broken ice around the vessels to maintain proper frigid consistency of the already frozen ice cream ingredients. In accordance with this invention the same casing space is utilized to hold a fluid-tight and preferably metallic interior casing 13 forming a refrigerating chamber 14 in which is placed one or more vessels 15 for holding the ice cream ingredients, two of such vessels being shown in the drawings. Each vessel 15 stands loosely but immovable laterally within a base flange 16 fixed to the chamber floor to hold the removable cream vessel in proper relation to the presently described mechanism which actuates an agitator or beater 17 revoluble in the creamy contents of the vessel. The inner casing 13 is considerably smaller than adjacent enclosing walls of the main casing to provide bottom and side and end spaces into which any suitable non-conductor, such as sawdust, cork granules or mineral wool 18 is packed as in ordinary household refrigerators. It is peferred to bend surplus upper parts of the side and end walls of the metal casing 13, to have them overlie and form a durable and easily cleaned top facing for adjacent portions of the work table 5, as shown in Figs. 2, 3 and 4. A narrow space or chamber 19 is specially reserved along the upper rear part of the casing 13, in which to invisibly place and protect parts of the mechanism actuating the cream vessel agitators 17, said chamber 19 being formed by a long horizontal partition plate 20, opposite end plates 21, 22, the transverse partition 23, which forms the inner end wall of the space containing the non-conductor 18, and by portions of the rear main casing wall 3 and of the work table 5. The entire heaviest left-hand end of the apparatus is preferably sustained above the floor 24 by legs 25, which may or may not be vertically adjustable.

A preferred power transmission for operating the ice cream vessel agitators 17, includes a horizontal driving shaft 26 journaled in a bearing 27 fixed to an intermediate transverse partition wall 28 of the main casing, and in two bearings formed in brackets 29, 30 fixed to the floor 20 of the casing chamber 19, into and along which the shaft 26 invisibly passes for protection from dust and creamy matter, or from refrigerating fluids used in the apparatus. A detailed description of the mechanism directly actuating the agitator 17 in one of the two cream vessels 15 will suffice for both, as follows. The agitator spindle 31 is stepped in a bearing 32 on the bottom of the cream vessel 15, and in a bearing 33 formed on a housing 34 having flanged feet 35 fixed to the vessel cover 36 which has a pendent marginal flange 37 loosely resting upon a bead or projection 38 surrounding the side wall of the vessel, as best shown in Fig. 4. A preferred means for detachably coupling the agitator spindle 31 to the power transmission shaft 26, comprises a stub shaft 39 journaled in a bearing 40 provided on the housing 34 and carrying a bevel pinion 41 permanently meshing with a bevel gear 42 on the spindle 31. The housing 34 both conceals and protects the gears 41, 42, and has a detachable cover 43 giving access to the gears for inspecting and oiling them. A drip cup 44 fixed to the spindle 31 below its bearing 33, catches any oil which may escape past the bearing and thus prevents passage of it along the spindle into the creamy contents of the vessel 15. The stub shaft 39 has an outer squared or flat sided portion upon which is fitted a sliding coupling member 45 having a slot 46 adapted to slip along a transverse pin 47 fixed in the shaft, and a coiled spring 48 on the shaft normally forces the coupling 45 outward into engagement with the inner squared end of a stub shaft 49 journaled in a bearing 50 formed on a bracket 51 bolted to the floor 20 of the chamber 19. This shaft 49 carries a bevel gear 52 meshing with a bevel gear 53 on the shaft 26, whereby a rotation of the shaft will rotate the spindle 31 and thus revolve the agitator 17 within the creamy contents of the vessel 15. When the agitated cream has been sufficiently congealed and the shaft 26 ceases rotation the operator will manually slide backward the coupling member 45 to disengage it from the shaft 49, whereupon the cover 36, with the housing 34, the gears 41, 42, the shaft 39, the spindle 31 and the agitator 17 may together be lifted from the cream vessel 15. When the agitator 17 is next to be used in a freshly recharged cream vessel 15, it is only necessary to slide the coupling 45 inward on the shaft 39 as the cover 36 is being applied to the vessel, and when the coupling is released the spring 48 again forces it outward to engage the opposed stub shaft 49. Any other readily detachable coupling connections may be used between the two shafts 39, 49.

When two or more cream vessels 15 are used in the apparatus a special cover is provided for the refrigerating chamber 14, which will allow quite full uncovering of it when desired and which will allow temporary uncovering of only one used cream vessel at a time to avoid undue waste of cold air from the chamber. When two cream vessels 15 are used, a triple cover is employed comprising a main cover 54 occupying most of the top area of the chamber 14 to give full access thereto, and two auxiliary covers 55, 56, fitted at openings of the main cover made directly above the two cream vessels 15, 15; the right hand cover 55 and over one-half of the main cover 54, being removed in Fig. 2.

In the refrigerating chamber 14 is placed a pipe coil 57 indicated by dotted lines in Figs. 1 and 2 and shown in cross section in Fig. 3. In this coil and its intake and outlet pipe connections is liberated and expanded the compressed ammoniacal or other freezing fluid circulated by a refrigerating plant, or system generally indicated by the letter R in Fig. 1, and which may be of any approved type including fluid compressing and forcing devices 58, operative by a driving shaft 59. This shaft may be coupled for rotation from the driving shaft 60 of an electric motor 61 which also is adapted to interchangeably operate the ice cream freezer agitators 17 in the vessels 15, as hereinafter more fully explained. Any suitable brine or other refrigerant liquid 62 is filled into the casing chamber 14 and surrounds the cream vessels 15 therein to a level near their top covers 36, and also practically submerges the pipe coil 57, as shown in Fig. 3.

Figs. 1 and 2 show that a belt 63 passes from a pulley 64 on the cream agitator driving shaft 26, to a pulley 65 loose on the refrigerating plant shaft 59. The hub of the pulley 65 carries a clutch member 66 which may be engaged by a clutch member 67 splined to the elongated hub of a pulley 68 loose on the shaft 59. A belt 69 passes from the pulley 68 to a driving pulley 70 fixed to the electric motor shaft 60. The outer end of the hub of pulley 68 carries a clutch member 71 adapted for engagement by a clutch 72 revoluble with the shaft 59. A clutch shifting lever 73 is fulcrumed at 74 to a pendent bracket 75 fixed to the apparatus main casing and engages at its lower end by a pin or roller with a circumferential groove in the splined clutch member 67. A shifter lever 76 is fulcrumed at 77 to the bracket 75, and has a pin or roller engagement with a circumferential groove in the clutch member 72. Short arms or levers 78, 79, fixed respectively to the fulcrum shafts of the levers 73, 76, are coupled by a link 80.

When the lever 73 is adjusted in the notch 81 of a catch-plate 82 fixed to the main casing the clutch member 67 will engage the clutch member 66 on the pulley 65, and the clutches 71, 72 will be disengaged as shown in the drawings. This causes rotation of the driving shaft 26 to operate the agitators 17 for the few minutes' time required to freeze the cream ingredients in the vessels 15, and while the refrigerating fluid compressing and circulating means 58 are inoperative. After the cream is congealed in the vessels 15, the lever 73 will be engaged with the left-hand notch 83 of the plate 82 which disengages the clutch members 66, 67 and engages the clutch members 71, 72, thereby stopping the agitator driving shaft 26 and starting the fluid compressing and circulating means 58 of the refrigerating apparatus which is operated most of the time to maintain proper low temperature in the ice cream freezing chamber 14 and in any other compartments of the apparatus into which the freezing fluid may be conducted, the fluid being circulated through a condenser 84 in the usual manner of operating a refrigerating apparatus of this character. It thus appears that the ice cream freezer agitators 17, and the fluid compression and circulating means 58, may be operated independently or alternately by or from one motor 61, and as varying conditions of service may require. Furthermore, the entire refrigerating apparatus R, and the motor 61, and their mechanism coupling and uncoupling devices are all compactly arranged at lower parts of the main casing and are invisible to customers being served who stand or sit next the exposed front wall 4 of the casing.

The main casing compartment 85 between the transverse partitions 23, 28, may be used for storage of glasses or dishes or utensils, or other material supplies usually provided for or with apparatus of this character. Said supplies are easily accessible after opening suitable lids or covers 86 fitted to openings at the top of the compartment, as shown in Figs. 1 and 2 of the drawings. The preferred non-conductor 18, may be dispensed with to leave only an air space between the double walls of the ice cream freezing chamber 14.

I claim as my invention:

1. In apparatus for supplying materials for dispensing purposes, including a casing forming a refrigerating chamber, a commodity container positioned within said refrigerating chamber, means for preparing a frozen commodity within said container, said means including an agitating mechanism removably positionable within said container, power transmitting means within said casing permanently positioned laterally of said container and disengageable operating connections between said power transmitting means and said agitating mechanism, whereby the agitating mechanism may be positioned or removed at will from the positioned container.

2. Means as in claim 1 characterized in that the agitating mechanism includes a rotatable element carried by a cover for the container, a housing mounted upon the cover and into which the element shaft extends, gearing within the housing, and a stub shaft extending from the housing and adapted to be operatively connected at will to a complemental permanently-positioned shaft of said power transmitting means, said mechanism being positionable and removable bodily with the container cover as a unit.

3. Means as in claim 1 characterized in that the operating connections for the agitating mechanism include a permanently-positioned driven shaft adapted to be operatively connected with the agitating mechanism of a container, said shaft being isolated from the refrigerating chamber, a stub shaft operatively connected to said driven shaft and projecting into said chamber, a complemental stub shaft extending from the agitating mechanism, and a coupling element adapted to connect said shafts operatively, whereby the agitating mechanism is positionable and removable at will as a unit by release of the coupling element.

4. Means as in claim 1 characterized in that the means for driving said agitating mechanism includes a permanently-positioned driven shaft adapted to be operatively connected with the respective agitating mechanisms of a plurality of alined containers, said driven shaft extending parallel to a vertical plane extending through the axes of the several containers and having a length to be opposite each of the positioned containers, said shaft being isolated from the refrigerating chamber, a stub shaft for and individual to each container with each stub shaft operatively connected to said driven shaft and projecting into said chamber, a complemental stub shaft extending from each agitating mechanism, and a coupling element for and adapted to connect an agitating mechanism stub shaft with its complemental stub shaft to provide drive engagement of the driven shaft with the agitating mechanism, whereby agitating activity may be provided with the containers singly or collectively at will.

5. In a dispensing apparatus, a casing forming a refrigerating chamber, a plurality of commodity containers positioned in a row within said refrigerating chamber, means for preparing a frozen commodity within said containers, a cover for said container, said means including an agitating mechanism mounted on said cover power transmitting means within said casing extending longitudinally of said row of containers and laterally thereof, and disengageable operating connections between said power transmitting means and said agitating mechanism, said casing having an opening directly over said container cover and agitating mechanism, and a cover for said opening, said agitating mechanism and container cover being adapted to be passed through said opening, whereby the agitating mechanism may be positioned or removed at will from the positioned container.

In testimony whereof I affix my signature.

IRA COHEN.